United States Patent [19]

Kopilak

[11] 4,444,144
[45] Apr. 24, 1984

[54] JIB SHACKLE

[76] Inventor: George J. Kopilak, 7 Center Ave., Wickatunk, N.J. 07765

[21] Appl. No.: 336,845

[22] Filed: Jan. 4, 1982

[51] Int. Cl.³ .............................................. B63H 9/08
[52] U.S. Cl. ................................. 114/114; 24/115 R; 24/232 R; 59/88; 59/89
[58] Field of Search ......................... 114/108, 113–115; 59/89, 88; 24/232 R, 129 R, 115 R

[56] References Cited

U.S. PATENT DOCUMENTS

| | | | |
|---|---|---|---|
| 309,482 | 12/1884 | McLendon | 59/89 |
| 1,597,259 | 8/1926 | Wilson | 59/89 |
| 3,631,570 | 1/1972 | Coleman | 24/129 R |
| 4,105,349 | 8/1978 | Kuppanman et al. | 24/129 R X |

Primary Examiner—Sherman Basinger
Attorney, Agent, or Firm—Stanley W. Sokolowski

[57] ABSTRACT

In the depicted embodiment, the jib shackle comprises a two-section body having converging arms extending therefrom. The sections of the body are relatively rotatable, about the axis of the body, to move the converging limbs into and out of proximity with each other. When the limbs are put into proximity, they define a closed loop with the body, and when moved out of proximity, open the loop. Ends of the body are apertured to receive therethrough a line (rope, hawser, etc.) which may be knotted, within the loop, to prevent its withdrawal from the shackle. Ends of the limbs which are remote from the body have complementary configurations which cause such ends mutually to nest with each other, upon being closed upon each other, to define the surfaces of the loop with substantially no discontinuities or abrupt edges. The novel shackle is formed of rigid plastic, hence on shipboard use it will not mar or otherwise abuse wooden or fiberglass boat surfaces.

11 Claims, 2 Drawing Figures

JIB SHACKLE

BACKGROUND OF THE INVENTION

This invention pertains to tackle used in sailing vessels and on board boats, and in particular to a novel shackle of simple configuration and smooth surfaces of especial utility in constraining the clew of a jib sail.

Shackles known in the prior art comprise the type in which a threaded pin must be screwed into place, to bridge across apertured bifurcations, and the type in which a closure gate is spring-biased. The former type useless if, as often happens, the pin is lost (dropped overboard), and is time-consuming, requiring the pin to be patiently turned into its socket. As for the latter type, the gate falls out of place, or the spring fatigues and the closure opens inadvertently. Besides these limitations, the prior art shackles have protruding hardware, abrupt edges, and discontinuities. As a consequence, they become obstructively engaged with stays and lines. When it is necessary to move the shackle, by lines coupled thereto, it experiences the aforesaid obstructive engagement. Consequently it becomes necessary to remove the shackle, by hand, from its inadvertent engagement with such line or stay, or the like. On sailing vessels, in which the shackle is used to control the jib sail, this means that a crewman must physically move out onto the bow and free shackle. This can be dangerous; at least it is a great inconvenience.

What has been needed for some time is a shackle of simple, fool-proof construction and functioning, and of smooth, continuous, and projection-less surfaces, so it is an object of this invention to disclose just such a long-sought shackle.

SUMMARY OF THE INVENTION

Particularly, it is an object of this invention to set forth a shackle, a jib shackle, comprising a body having an axial length of a given dimension from one end thereof to the other thereof; said body having means for securing filamentary material to said axial ends thereof; and limbs fixed to said body and extending, from first ends thereof, from said body at angles transverse to said axial length of said body; wherein said limbs, and second ends thereof, comprise means cooperative with said body defining a closed loop therebetween.

BRIEF DESCRIPTION OF THE DRAWINGS

Further objects of this invention, as well as the novel features thereof, will become more apparent by reference to the following description, taken in conjunction with the accompanying figures, in which.

DESCRIPTION OF THE PREFERRED EMBODIMENT

Figure 1:
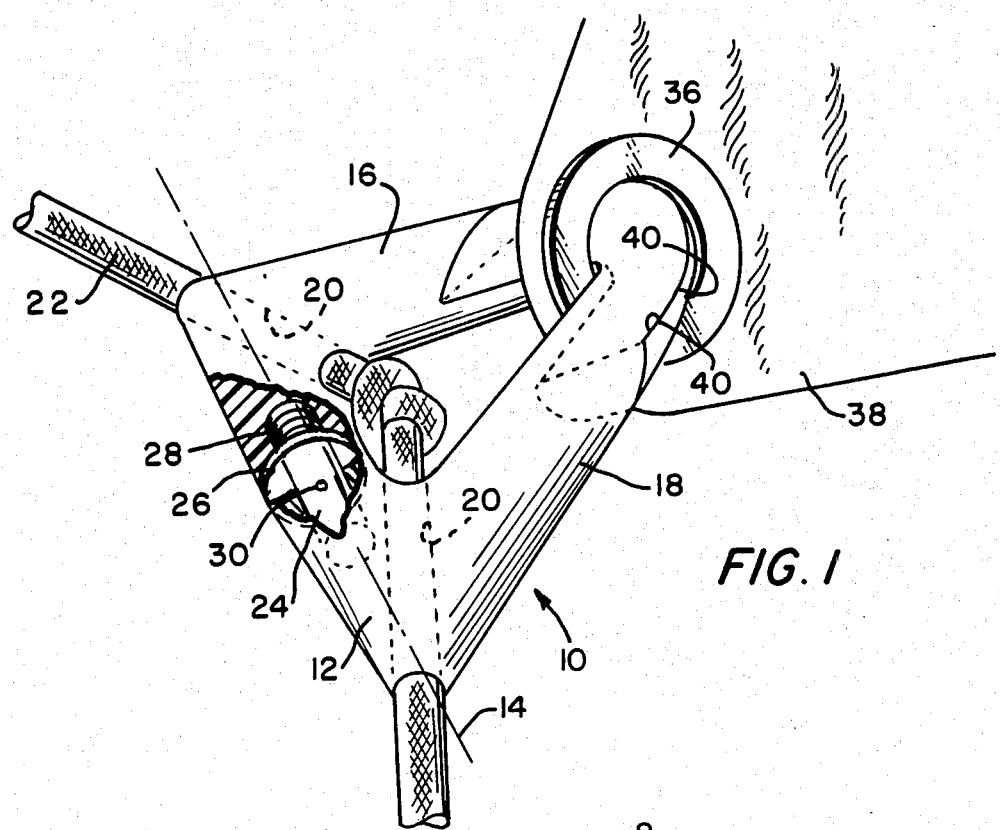
FIG. 1 is an isometric projection of the novel shackle, according to an embodiment thereof, shown in its closed position.

As shown in the Figures, according to an embodiment of the invention, the novel shackle 10 comprises a body 12 having an axis 14 to the ends of which are fixed a pair of limbs 16 and 18, the latter extending from the body 12 angularly to define angular junctures with the body at the ends of the body. Apertures 20 are formed through the ends of the body 12 whereat the limbs 16 and 18 are joined thereto, i.e., the apertures 20 are formed through the aforesaid angular junctures. The apertures open outwardly of the shackle 10 as well as inwardly thereof to accommodate a line 22. The line 22 passes through one of the apertures 20 into the center of the shackle 10, is knotted thereat, and passes through the other of the apertures.

Figure 2:
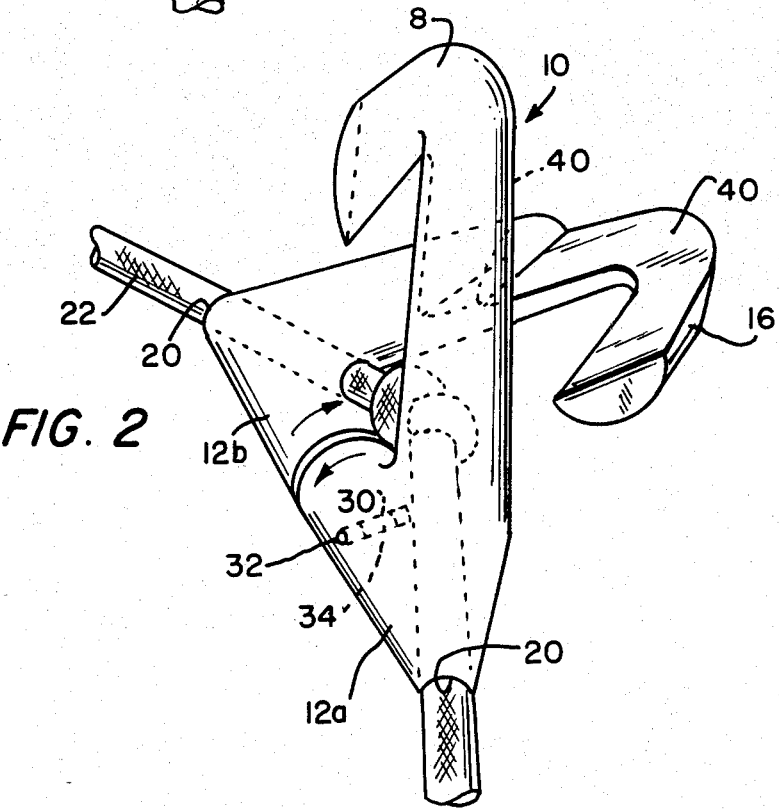
FIG. 2 is an isometric projection of the shackle of FIG. 1, shown in its open position.

The body 12 is formed of two sections 12a and 12b coupled together by means of a stud 24. Section 12a has a smooth, axially-extending bore 26 formed therein, and section 12b has a threaded, axially-extending bore 28 formed therein. The stud 24 is threaded at one end, and that end is threadedly fixed in bore 28; the other end of the stud is unthreaded, and it is made fast in the bore 26. The latter end of the stud 24 has a pin hole 30 formed therein in traverse thereof which is aligned with a complementary pin hole 32 formed in section 12a. A pin 34 is forceably fixed in the pin holes 30 and 32 to secure the unthreaded end of the stud 24 integrally to section 12a. As can be appreciated, rotation of one section 12a or 12b relative to the other thereof will move the limbs 16 and 18 into and out of proximity to each other, as the threaded end of the stud 24 turns into and out of the bore 28. Hence, the shackle 10 defines a closed loop, as shown in FIG. 1, when the limbs 16 and 18 have been closed upon each other, and an open loop, as shown in FIG. 2, when the limbs have been moved out of proximity to each other. When the loop is open, the grommet 36 of the clew 38 of a jib sail (or the like) can be slid over the shank of one of the limbs 16 or 18 and downward toward the body 12. Then, the limbs can be closed upon each other securing the grommet 36 within the loop. Nor can the grommet 36 come free of the loop, as the limbs 16 and 18 have complementary portions which describe substantially right-angles which come into juxtaposition and thus interlock.

The body 12 of the shackle 10 is of substantially circular cross-section, and so are the innermost portions of the limbs 16 and 18. However, the outermost portions of the limbs 16 and 18, i.e., those portions which describe the aforementioned substantially right-angular conformations, are of substantially semi-circular cross-sections. The flat surfaces 40 of the latter cross-sections are in confronting relationship. Thus, when closed upon each other, as shown in FIG. 1, each limb nestably receives the other; a smooth, uninterrupted or blended-in, overall cross-section of circular conformation is defined therebetween.

The shackle 10 of this invention is of simple and efficient structure. It presents no surfaces, edges, or hardware which can become snagged on other tackle, lines, or the like. The knot in the line 22 is shrouded by the body 12 and limbs 16 and 18, and the clasping ends of the limbs 16 and 18 close into continuity.

As shown in the cut-away portions of the shackle 10 in FIG. 1, the latter, i.e., the body 12 and limbs 16 and 18, is formed of plastic. This is to prevent abuse of wooden or fiberglass surfaces of the environment in which the shackle is used. Now, of course, the shackle could be formed of other materials: wood, fiber-glass, etc. Additionally, while the stud 24 is metal, it too could be formed of rigid plastic, fiberglass, etc. To give the shackle 10 more durability and strength, it could be formed of plastic-coated metal, and where the environment of its use is not susceptible of abuse, it could be wholly formed of metal. Such modifications or alterations of the shackle 10 are deemed to be within the ambit of my invention and comprised by the following claims. Thus, while I have described my invention in connection with a specific embodiment thereof, it is to be clearly understood that this is done only by way of example and not as a limitation of the scope of my invention as set forth in the objects thereof and in the appended claims. For instance, I show the limbs 16 and 18 as having substantially mirror-image semi-circular cross-sections which nest together. Clearly, one limb could have a bi-furcation, and the other an interleaving finger, for the nesting-together of the limbs. The embodiment depicted is simply the preferred embodiment of the invention, but certainly not the only feasible embodiment which my teaching comprehends.

I claim:

1. A jib shackle, comprising:
a body having an axial length of a given dimension from one end thereof to the other thereof;
said body also having means for securing filamentary material to said axis ends thereof; and
limbs fixed to said body and extending, from first ends thereof, from said body at angles transverse to said axial length of said body, defining with said body angular junctures; wherein
said limbs and second ends thereof comprise means cooperative with said body defining a closed loop therebetween;
said securing means comprises apertures formed through said angular junctures, opening externally of said shackle and internally thereof onto said closed loop, to receive therethrough a length of filamentary material and to accommodate a portion of such filamentary material within said loop;
each of said limbs is of substantially circular cross-section throughout a first length thereof, and of substantially semi-circular cross-section throughout a second length thereof;
said second lengths of said limbs have substantially flat surfaces; and
said flat surfaces of said second lengths of said limbs are disposed in confronting relationship.

2. A jib shackle, according to claim 1, wherein:
said body has means operative for moving said flat surfaces into and out of proximity to each other, whereby said loop is closed and opened, respectively.

3. A jib shackle, comprising:
a body having an axial length of a given dimension from one end thereof to the other thereof;
said body also having means for securing filamentary material to said axial ends thereof; and
limbs fixed to said body and extending, from first ends thereof, from said body at angles transverse to said axial length of said body, defining with said body angular junctures; wherein
said limbs and second ends thereof comprise means cooperative with said body defining a closed loop therebetween;
said securing means comprises apertures formed through said angular junctures, opening externally of said shackle and internally thereof onto said closed loop, to receive therethrough a length of filamentary material and to accommodate a portion of such filamentary material within said loop; and
said body has means operative for moving said limbs into and out of proximity to each other, whereby said loop is closed and opened, respectively.

4. A jib shackle, according to claim 3, wherein:
said loop has an inner, circumferential surface; and
said apertures open onto said surface.

5. A jib shackle, according to claim 3, wherein:
each of said limbs is of substantially circular cross-section throughout a first length thereof, and of substantially semicircular cross-section throughout a second length thereof.

6. A jib shackle, according to claim 5, wherein:
said second lengths of said limbs are of configurations which are substantially mirror-images of each other.

7. A jib shackle, according to claim 3, wherein:
said body comprises a plurality of sections; and
said limbs-moving means comprises means for moving at least one of said sections relative to another thereof.

8. A jib shackle, according to claim 7, wherein:
at least one of said sections has a first, threaded bore formed therein extending axially thereof;
another of said sections has a second bore formed therein extending axially thereof; and further including
a stud, threaded at at least one end, and having an opposite end; wherein said one end of said stud is secured in said first, threaded bore, and said opposite end of said stud is engaged with said second bore.

9. A jib shackle, according to claim 3, wherein:
said body and limbs are formed of non-metallic material.

10. A jib shackle, according to claim 3, wherein:
said body and limbs are formed of plastic.

11. A jib shackle, comprising:
a body having an axial length of a given dimension from one end thereof to the other thereof;
said body also having means for securing filamentary material to said axial ends thereof; and
limbs fixed to said body and extending, from first ends thereof, from said body at angles transverse to said axial length of said body, defining with said body angular junctures; wherein
said limbs and second ends thereof comprise means cooperative with said body defining a closed loop therebetween;
said securing means comprises apertures formed through said angular junctures, opening externally of said shackle and internally thereof onto said closed loop, to receive therethrough a length of filamentary material and to accommodate a portion of such filamentary material within said loop;
each of said limbs is of a given cross-section throughout a first length thereof, and of another cross-section throughout a second length thereof; and
at least one of said limbs has a second length cross-sectional configuration which nestably receives said second length of the other of said limbs.

* * * * *